United States Patent [19]

Emura et al.

[11] Patent Number: 4,775,113
[45] Date of Patent: Oct. 4, 1988

[54] DRAG MECHANISM IN DOUBLE-BEARING REEL

[75] Inventors: Masaharu Emura; Takehiro Kobayashi, both of Hiroshima, Japan

[73] Assignee: Ryobi Ltd., Hiroshima, Japan

[21] Appl. No.: 33,748

[22] Filed: Apr. 3, 1987

[30] Foreign Application Priority Data

Apr. 7, 1986 [JP] Japan .............................. 61-52653[U]

[51] Int. Cl.$^4$ .......................................... A01K 89/015
[52] U.S. Cl. .............................. 242/84.1 J; 242/84.42; 242/217
[58] Field of Search ................ 242/84.1 R, 84.4, 84.41, 242/84.42, 211–214, 216–220, 84.1 J

[56] References Cited

U.S. PATENT DOCUMENTS

| | | | |
|---|---|---|---|
| 3,104,850 | 9/1963 | Wood | 242/221 |
| 3,612,437 | 10/1971 | Allebach | 242/216 |
| 4,572,455 | 2/1986 | Noda | 242/217 |

FOREIGN PATENT DOCUMENTS 12925  1/1985  Japan .

Primary Examiner—Stuart S. Levy
Assistant Examiner—Joseph J. Hail, III
Attorney, Agent, or Firm—Finnegan, Henderson, Farabow, Garrett and Dunner

[57] ABSTRACT

In a double-bearing reel with a level wind mechanism in which the handle can be set either on the right or on the left, a drag mechanism is so designed that a handle shaft with a drag handle at one end can be inserted into a hollow traverse cam shaft from both ends and which is held between side frames in a manner as to be opposite openings formed in side covers, and a drag control nut is detachably engaged with one end of the transverse cam shaft the other end of which supports the master gear of a drive mechanism and drag mechanism in such a manner that the drag control nut is nonrotatable with respect to the drag handle but movable in the forward direction, whereby the handle is turned in the forward direction to increase the drag force regardless of whether the reel is operated with the handle on the right or the left of the reel.

5 Claims, 2 Drawing Sheets

DRAG MECHANISM IN DOUBLE-BEARING REEL

BACKGROUND OF THE INVENTION

This invention relates to a star drag handle type doublebearing reel with a level wind mechanism for uniformly winding a fishing line on a spool, in which the handle can be set on the left as well as on the right A conventional double-bearing reel of this type has been disclosed, for instance, by Japanese patent application (OPI) No. 12925/1985 (the term "OPI" as used herein meaning "an examined published application"). However, the conventional double-bearing reel is disadvantageous in that the drag tightening direction (i.e., the drag force increasing direction) when the reel is operated with the handle on the right of the reel is opposite to the drag tightening direction when the handle is on the left of the reel. In the former case, the drag handle is turned in the forward direction to tighten the drag, whereas in the latter case, the drag handle must be turned in the reverse direction to tighten the drag. Thus, the conventional double-bearing reel is impractical and is not satisfactory in operation.

SUMMARY OF THE INVENTION

Accordingly, an object of this invention is to overcome the above-described difficulties accompanying a conventional star drag handle type double-bearing reel with a level wind mechanism and in which the handle can be set either on the right or on the left of the reel.

More specifically, an object of the present invention is to provide a drag mechanism for a double-bearing reel in which the handle can be set on the left as well as on the right, and which permits rotation of the drag handle in the forward direction to increase the drag force, regardless of whether the reel is operated with the handle on the right or with the handle on the left. Thus, there is provided improved operability, while allowing the handle to be readily changed from one side of the reel to the other.

The foregoing objects and other objects of the invention are achieved by a double-bearing reel comprising a pair of spaced apart side frame members, each including a side cover member with an opening therein; a spool member rotatably supported by the side frame members; drag means operatively connected to the spool member; a drive mechanism, including a master gear, operatively connected to the spool member; a handle member operatively connected to the drag means and the drive mechanism for applying torque to the spool member; a level wind mechanism operably connected to the handle member and the spool member to transmit torque from the handle member through the drag means and the drive mechanism to the spool member; and a drag mechanism comprising: a hollow transverse cam shaft rotatably supported between the side frames in such a manner that each end of the transverse cam shaft is aligned with one of the openings in one of the side covers, with a first end of the transverse, cam shaft supporting the master gear of the drive mechanism and the drag means; a handle shaft for insertion into the transverse cam shaft in such a manner that the handle shaft is non-rotatable in the transverse cam shaft, the handle shaft being insertable into the transverse cam shaft from either end and being secured at its base end to the handle member and having a retaining nut at the other end thereof; a drag handle engaged with a first threaded part at the base end of the handle shaft on which the handle is mounted; and a drag control nut engaged with a second threaded part on a second end of the transverse cam shaft, which second threaded part is larger in pitch than the first threaded part, in such a manner that the drag control nut is non-rotatable with respect to the drag handle and movable in the axial direction, wherein the drag means, master gear, transverse cam shaft and drag control nut together with a drag collar are held between the handle member and the retaining nut.

BRIEF DESCRIPTION OF THE DRAWINGS

The nature, principle and utility of the invention will become fully apparent from the following detailed description when read in conjunction with the accompanying drawings, wherein.

DETAILED DESCRIPTION

Figure 1:
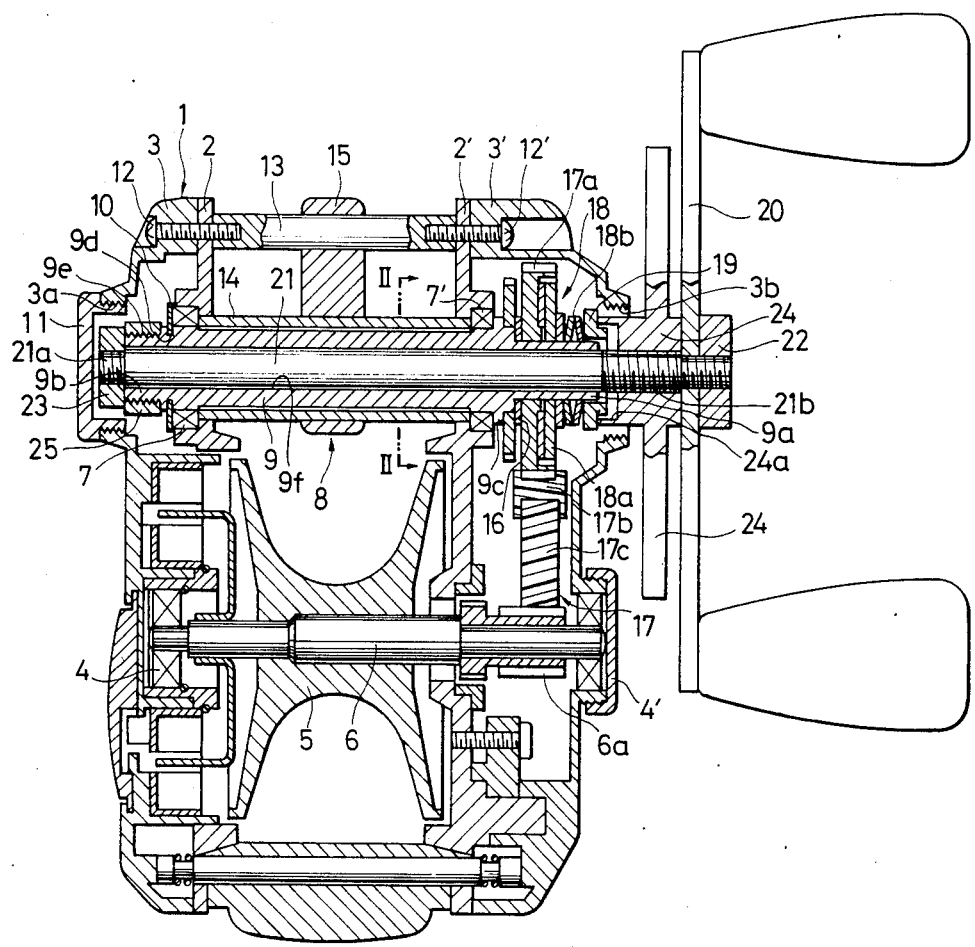
FIG. 1 is a sectional view showing one example of a drag mechanism in a double-bearing reel according to the present invention.

One example of a double-bearing reel drag mechanism according to this invention will be described with reference to the accompanying drawings.

As shown in FIGS. 1 through 4, a reel body 1 has a pair of side frames 2 and 2' spaced away from each other, and side covers 3 and 3' secured respectively to the side frames 2 and 2' through respective bearings 4 and 4'.

A transverse, cam shaft 9 of a level wind mechanism 8 is rotatably supported by the side frames 2 and 2' respectively through bearings 7 and 7', and the shaft 9 is in parallel with the spool shaft 6. A flange 9c formed at one end portion 9a of the transverse cam shaft 9, and a retaining ring 10 engaged in a groove 9d cut in the other end portion 9b are abutted against the outer surfaces of the bearings 7' and 7, respectively, to prevent the movement of the transverse cam shaft 9 in the axial direction. The two end portions 9a and 9b are smaller in diameter than the middle portion, and are opposite to and held in alignment with openings 3a and 3b formed in the side covers 3 and 3', respectively. A handle shaft 21 (described later) is inserted into the transverse cam shaft 9 through the opening 3a or 3b, so that a handle 20 can be set on the right-hand side or the left hand side of the reel. The openings 3a and 3b are threaded-holes equal in diameter. One of the openings 3a and 3b is closed with a common threaded cover 11.

In the level wind mechanism 8, a line guide holder 15 is mounted on a guide rod 13 which is held between the side frames 2 and 2' with screws 12 and 12' in such a manner that the guide rod 13 is in parallel with the transverse cam shaft 9, and on a protective cylinder 14 fitted on the transverse cam shaft 9 in such a manner that the line guide holder 15 is slidable in the axial direction and is slidably engaged with a cam groove (not shown) cut in the cylindrical surface of the transverse cam shaft 9. Therefore, as the transverse cam shaft 9 is rotated, the line guide holder 15 is reciprocated horizontally so that the fishing line (not shown) is uniformly wound on the spool 5.

A master gear 17a of a drive mechanism 17 together with a washer 16 is mounted on the one end portion 9a of the transverse cam shaft 9 in such a manner that the master gear 17a is rotatable and slidable in the axial direction and the washer 16 is held between the middle portion of the transverse cam shaft 9 and the master gear 17a. The one end portion 9a is made substantially elliptical in section, and a drag means 18 and a drag collar 19 are mounted on the one end portion 9a thus formed in such a manner that they are non-rotatable, but slidable in the axial direction. A right-handed thread 9e is cut in the surface of the other end portion 9b of the transverse cam shaft 9, and a drag control nut 25 is engaged with the right-handed thread 9e in such a manner that it is movable in the axial direction.

The aforementioned drive mechanism 17 is formed by providing idle gears 17b and 17c between the master gear 17a and a pinion 6a mounted on the spool shaft 6. The above-described drag means 18 comprises a slide plate 18a and drag washers and spring members 18b. When the drag collar 19 is pushed to the left as shown in FIG. 1, the drag means 18 is tightened, thus increasing the drag force.

The transverse, cam shaft 9 is a hollow shaft. A handle shaft 21, which has a handle 20 secured to its base end with a nut 22, is detachably inserted into the hollow 9f of the transverse cam shaft 9 so that it can be provided either on the right side or the left side of the reel, in such a manner that the handle shaft 21 is rotatable together with the rotation of the transverse cam shaft 9 and is slidable with respect thereto. The handle shaft 21 has a threaded part 21a at the other end which is smaller in diameter. A nut 23 is detachably engaged with the threaded part 21a of the handle shaft 21 until the nut 23 abuts against the outer end faces of the transverse cam shaft 9 and the drag control nut 25, thereby to prevent the movement of the handle shaft 21 in the axial direction.

A right-handed thread is cut in the cylindrical surface of the base end portion of the handle shaft 21 to which the handle 20 has been secured. A drag handle 24 is screwed on the righthanded thread part 21 of the handle shaft 21 in such a manner that the drag handle 24 is movable in the axial direction. As is apparent from the above description, the drag collar 19, the drag means 18, the master gear 17a, the drag control nut 25, and the transverse cam gear 9 are held between the retaining nut 23 and the handle 20 in the axial direction.

Figure 2:
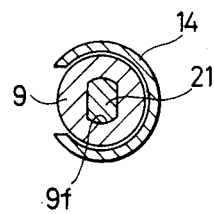
FIG. 2 is a sectional view taken along line II—II in FIG. 1, showing one example of means for preventing the rotation of a handle shaft with respect to a transverse cam shaft in the drag mechanism shown in FIG. 1.
Figure 3:
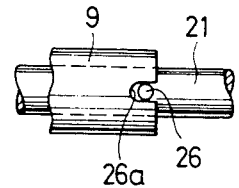
FIG. 3 is a plan view showing another example of the means shown in FIG. 2.

The rotation of the handle shaft 21 in the transverse, cam shaft 9 can be prevented as follows: As shown in FIG. 2, the hollow 9f of the transverse, cam shaft 9, and the handle shaft 21 are irregular, e.g., made substantially elliptical, in crosssection so that the transverse cam shaft 9 and the handle shaft 21, after being combined together, can be turned as one unit. Alternatively, as shown in FIG. 3, an engaging groove 26a is formed in one end of the transverse cam shaft 9, and a pin 26 is embedded in the handle shaft 21 in such a manner that the pin 26 is extended perpendicularly to the axis. The pin 26 is engaged with the groove 26a so that the transverse cam shaft 9 and the handle shaft 21 are turned as one unit. Any other conventional methods may be employed to prevent the rotation of the handle shaft 21 in the transverse, cam shaft 9.

Figure 4:
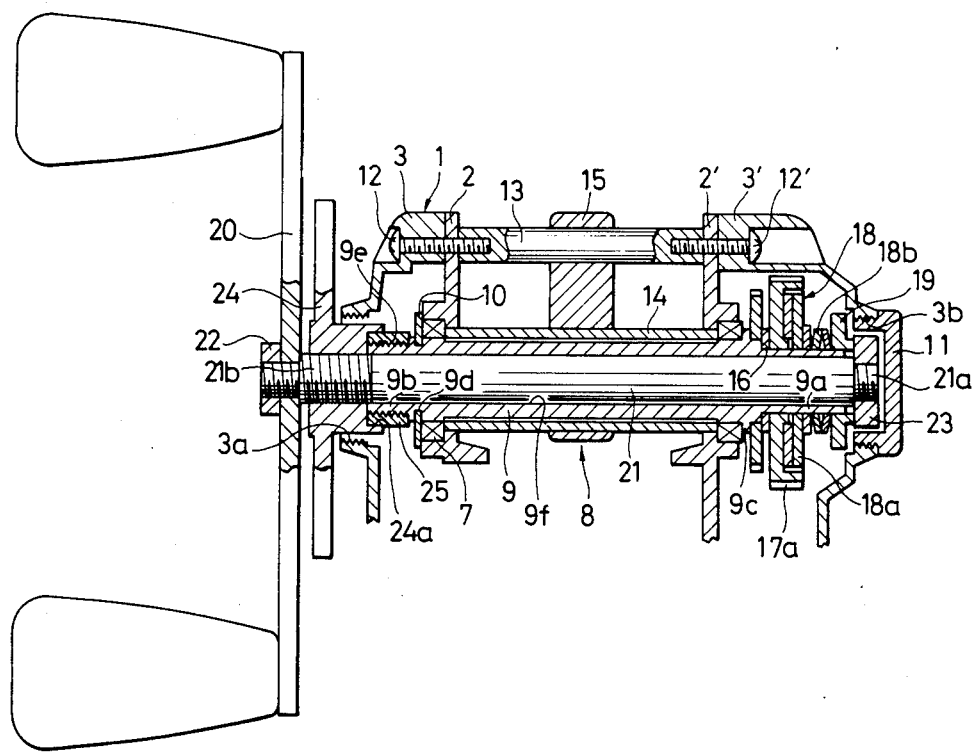
FIG. 4 is a sectional view showing the drag mechanism in the double-bearing reel of the present invention which has been so converted as to be operated with the handle on the left according to the invention.

In order to allow the drag control nut 25 to engage with the drag handle 24 in such a manner that the nut 25 is slidable in the axial direction but not rotatable relative to the drag handle 24, the external configuration of the drag control nut 25 and a recess 24a formed in the inner end of the drag handle 24 are irregular, e.g., substantially elliptic or polygonal in cross-section. Therefore, in the case where the reel is used with the handle on the left as shown in FIG. 4, the drag handle 24 is engaged with the drag control nut 25 in such a manner that drag handle 24 and the drag control nut 25 are rotatable together at the recess 24a, and are slidable in the axial direction.

In the case where the reel is operated with the handle on the right as shown in FIG. 1, the drag handle 24 is turned in the forward direction of the handle 20. As a result, the drag handle 24 is moved to the left in FIG. 1 with the aid of the righthanded thread part 21b of the handle shaft 21, so that the drag means 18 and the master gear 17a are pushed through the drag collar 19 against the flange 9c of the transverse cam shaft 9, thus increasing the drag force.

In the case where it is required to operate the reel with the handle on the left, the threaded cover 11 is removed, and the retaining nut 23 is also removed. Under this condition, the handle shaft 21 is pulled to the right in FIG. 1. In this operation, the handle shaft 21 and the drag handle 24 are removed as one unit from the transverse cam shaft 9.

The handle shaft 21 is inserted into the opening 3a of the side cover 3 and then into the axial hollow 9f of the transverse cam shaft 9. Thereafter, the nut 23 is engaged with the threaded part 21a at the end of the handle shaft 21. Under this condition, the drag control nut 25 is inserted into the recess 24a of the drag handle 24. Thus, the left-handle-operated reel is obtained.

When the reel is operated with the handle on the left side the drag handle 24 is turned in the forward direction of the handle and the drag handle 24 is moved to the left as shown in FIG. 4. In this case, because of the sandwich structure of the drag collar 19, the drag means 18, the master gear 17a, the drag control nut 25, and the transverse cam shaft 9 which are held between the retaining nut 23 and the handle 20 as was described before, the axial length increases, and the drag means 18 is slackened. However, at the same time, the drag control nut 25 is turned by the drag handle 24, and the handle 21 is moved to the left of the position shown in FIG. 4 because the right-handed thread part 9b of the transverse cam shaft 9, with which the drag control nut 25 has been engaged, is larger in pitch than the right-handed thread part 21b of the handle shaft 21, with which the drag handle 24 has been engaged. As a result, the drag means 18 is tightened through the drag collar 19 by the retaining nut 23, thus increasing the drag power.

Both in the case where the reel is operated with the handle on the right and in the case where the reel is operated with the handle on the left, the drag force can be decreased by turning the drag handle in the reverse direction of the handle 20.

As is apparent from the above description, when it is required to convert the double-bearing reel which is operated with the handle on the right into one which is operated with the handle on the left, or vice versa, it is unnecessary to disengage the drag control nut 25 from the transverse cam shaft 9. That is, the conversion can be achieved merely by removing the retaining nut 23 and by inserting the handle shaft 21 into the transverse cam shaft 9 through its one end or the other end. Both in the righthandle-operated reel and in the left-handle-operated reel, the drag means 18 is tightened by turning the drag handle in the forward direction of the handle 20. Therefore, the double-bearing reel drag mechanism of the invention is practical and excellent in operation.

Furthermore, the one end portion 9a of the transverse cam shaft 9 supports the master gear 17a and the drag means 18, and the other end portion 9b supports drag control nut 25. Therefore, the reel with the drag mechanism according to the invention has better balance between the right and the left than that in which those components are supported on one side only.

In addition, the drag mechanism according to the invention is simple in construction and can be manufactured at low cost.

Having described the above embodiments of the present invention, variations and modifications, falling within the scope of the appended claims, may become apparent to one skilled in the art.

What is claimed is:

1. A double-bearing reel comprising:
   (a) a pair of side frame members, said members being spaced apart;
   (b) a pair of side cover members, each one of said pair associated with a respective one of said side frame members and having at least one opening therein;
   (c) a spool member rotatably supported by said side frame members;
   (d) drag means for increasing or decreasing a drag force on said spool member;
   (e) a drive mechanism comprising a master gear and a plurality of idle gears, at least one of said idle gears being in operational contact with said spool member;
   (f) a drag mechanism comprising a hollow transverse cam shaft having a first end and a threaded second end, said transverse cam shaft being rotatably supported between said side frame members so that said first end and said threaded second end are aligned with a respective one of said at least one opening in each of said side cover members, and wherein one end of said transverse cam shaft supports said master gear and said drag means;
   (g) a handle shaft for insertion into said hollow transverse cam shaft, said handle shaft having a base end, an opposite end and a first threaded part, said threaded second end of said transverse cam shaft being larger in pitch than said first threaded part of said handle shaft, said handle shaft and said transverse cam shaft being rotatable together, and said handle shaft being slidable axially in said transverse cam shaft;
   (h) a drag handle threadably engaged with said first threaded part of said handle shaft, wherein said base end and said first threaded part of said handle shaft are in close proximity;
   (i) a drag control nut threadably engaged with said threaded second end of said transverse cam shaft, wherein said drag control nut and said drag handle are rotatable together and said drag control nut is movable axially relative to said drag handle;
   (j) a handle member secured to said base end of said handle shaft for indirectly applying torque to said spool member;
   (k) a retaining nut threadably engaged to said opposite end of said handle shaft to secure said handle shaft relative to said transverse cam shaft;
   (l) a level wind mechanism reciprocally attached to said transverse cam shaft to facilitate uniform winding of line on said spool member; and
   (m) a drag collar adjacent to said drag handle to facilitate contact between said master gear and said drag means, and wherein said drag means, master gear, transverse cam shaft, drag control nut and drag collar are between said handle member and said retaining nut.

2. The reel of claim 1, wherein the hollow of said hollow transverse cam shaft and said handle shaft each have an irregular cross-section.

3. The reel of claim 1, wherein said transverse cam shaft has an engaging groove therein and said handle shaft has a pin member adapted to engage said groove.

4. The reel of claim 1, wherein said drag means comprises a slide plate, drag washers and spring members and wherein said reel further includes a drag collar positioned between said drag means and said drag handle.

5. The reel of claim 1, wherein the threads of both said first threaded part and said threaded second end are righthanded threads.

* * * * *